US008567457B2

(12) United States Patent
Polewarczyk et al.

(10) Patent No.: US 8,567,457 B2
(45) Date of Patent: Oct. 29, 2013

(54) COLLAPSIBLE FUNNEL WITH INTEGRAL CAP FOR FILLING VEHICLE FLUID RESERVOIR

(75) Inventors: Joseph M. Polewarczyk, Rochester Hills, MI (US); Kevin G. Kolpasky, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 437 days.

(21) Appl. No.: 12/916,915

(22) Filed: Nov. 1, 2010

(65) Prior Publication Data

US 2012/0103467 A1 May 3, 2012

(51) Int. Cl.
*B65B 39/00* (2006.01)
*B67C 11/02* (2006.01)

(52) U.S. Cl.
CPC .................................... *B67C 11/02* (2013.01)
USPC ............................ 141/338; 141/331; 141/337

(58) Field of Classification Search
USPC ......................................... 141/331, 337, 338
See application file for complete search history.

(56) References Cited

U.S. PATENT DOCUMENTS

| | | | | |
|---|---|---|---|---|
| 1,461,654 | A * | 7/1923 | Haessler | 141/338 |
| 1,510,631 | A * | 10/1924 | Nutry | 141/338 |
| 1,740,418 | A * | 12/1929 | Donnelly | 141/337 |
| 4,286,634 | A * | 9/1981 | Wisner | 141/95 |
| 4,557,378 | A | 12/1985 | Klebold | |
| 4,856,568 | A * | 8/1989 | Murphy et al. | 141/337 |
| 5,033,521 | A * | 7/1991 | Martin | 141/337 |
| 5,082,035 | A * | 1/1992 | Maxwell | 141/98 |
| 5,188,157 | A * | 2/1993 | Lee | 141/338 |
| 6,152,198 | A * | 11/2000 | Nguyen | 141/337 |
| 6,223,793 | B1 * | 5/2001 | Donoughe et al. | 141/338 |
| 6,397,907 | B1 * | 6/2002 | Heintz | 141/338 |
| 7,264,027 | B2 * | 9/2007 | Rosenbaum | 141/338 |
| 7,322,386 | B2 * | 1/2008 | Holm | 141/338 |
| 7,635,013 | B2 * | 12/2009 | Ballinger | 141/338 |
| 7,886,782 | B1 * | 2/2011 | Curtis | 141/338 |

FOREIGN PATENT DOCUMENTS

| | | |
|---|---|---|
| GB | 2364935 A | 2/2002 |
| WO | 9731836 A1 | 9/1997 |

OTHER PUBLICATIONS

U.S. Appl. No. 12/915,651 titled "Collapsible Funnel" filed Oct. 29, 2010.

* cited by examiner

*Primary Examiner* — Timothy L Maust
(74) *Attorney, Agent, or Firm* — Quinn Law Group, PLLC

(57) ABSTRACT

An apparatus for a vehicle having a fluid reservoir fillable with fluid from a container includes a fill tube that empties into the reservoir. A funnel is fixed to the fill tube. The funnel collapses to a stowed position and extends to a use position. The funnel collapses and extends only outside of the fill tube. A cap is connected to the funnel and seals the fill tube opening when the funnel is in the stowed position. The cap is removable from the fill tube opening and has an extension that opens a seal of the container when the funnel is in the use position to permit filling of the reservoir through the funnel and the fill tube.

12 Claims, 3 Drawing Sheets

COLLAPSIBLE FUNNEL WITH INTEGRAL CAP FOR FILLING VEHICLE FLUID RESERVOIR

TECHNICAL FIELD

The invention relates to an apparatus for filling a vehicle fluid reservoir.

BACKGROUND

Fluid reservoirs are often filled through a tube, using a funnel to direct fluid from a filling container into the tube. For example, windshield washer fluid must be routinely replenished in a vehicle. Filling the windshield washer reservoir is made easier with a funnel. However, it is sometimes necessary to fill the reservoir at a location where a funnel is not available, since it may not be convenient to carry a funnel along in the passenger compartment or trunk. It can be difficult for a vehicle owner to open a typical seal on a filling container without getting fluid on himself. Also, care must be taken to avoid losing the cap of the fill tube or the reservoir when it is removed during filling.

SUMMARY

An apparatus is provided that is configured to allow a vehicle owner to easily open a sealed fluid container when attempting to replenish a vehicle fluid reservoir. The apparatus makes any additional equipment unnecessary, such as a sharp instrument to open the fluid container or a separate funnel.

Specifically, an apparatus for a vehicle having a fluid reservoir fillable with fluid from a container includes a fill tube that empties into the reservoir. A funnel is fixed to the fill tube. The funnel collapses to a stowed position and extends to a use position. The funnel collapses and extends only outside of the fill tube. A cap is connected to the funnel and seals the fill tube opening when the funnel is in the stowed position. The cap is removable from the fill tube opening and has an extension that opens a seal of the container when the funnel is in the use position to permit filling of the reservoir through the funnel and the fill tube. The funnel may have pleats that allow the funnel to form a generally accordion-shape when in the collapsed position.

The above features and advantages and other features and advantages of the present invention are readily apparent from the following detailed description of the best modes for carrying out the invention when taken in connection with the accompanying drawings.

DETAILED DESCRIPTION

Figure 1:
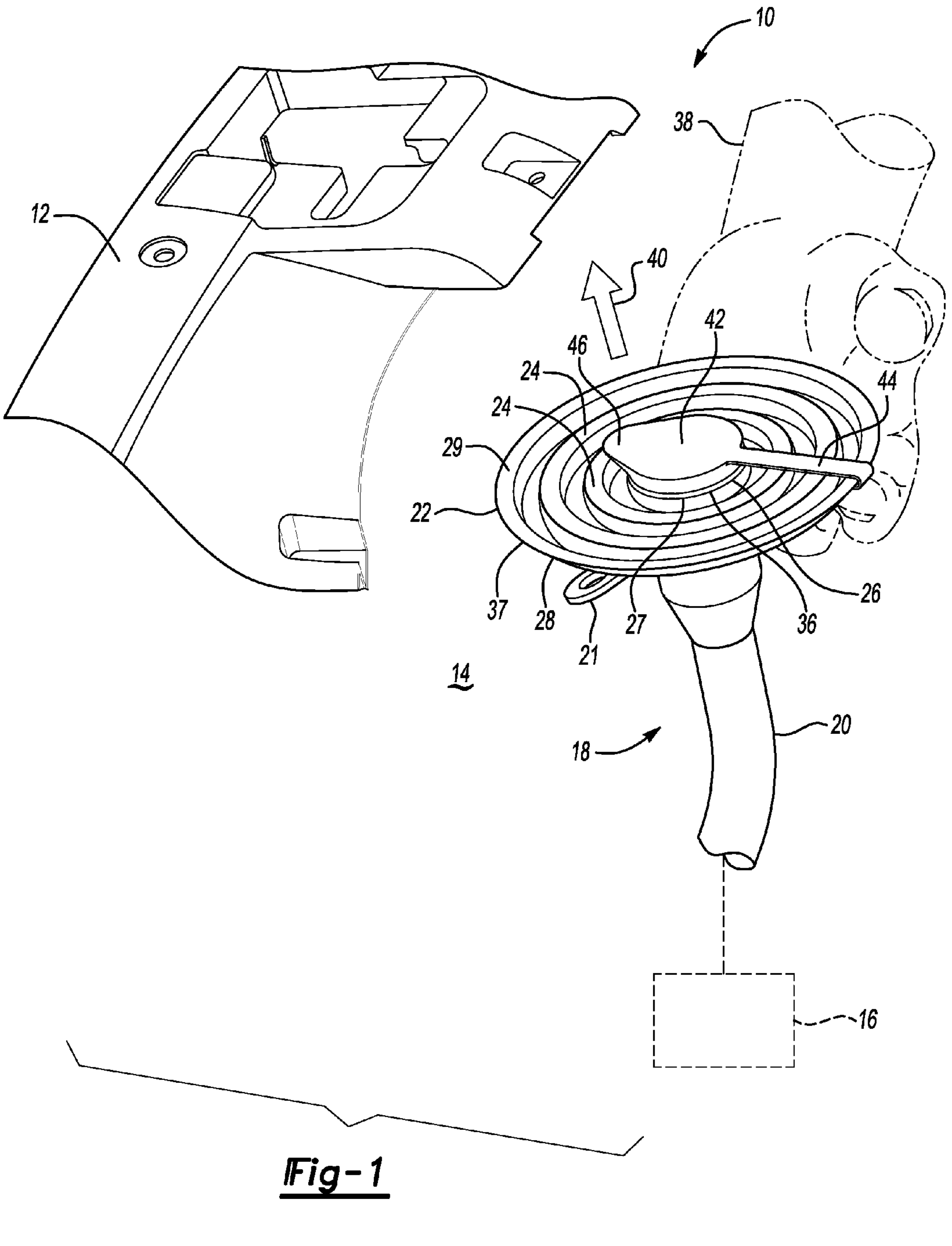
FIG. 1 is a schematic perspective view of a portion of a vehicle with an apparatus that includes a funnel and fill tube for filling a fluid reservoir, with the funnel shown in a collapsed position and with a cap closing the fill tube.

Referring to the drawings, wherein like reference numbers refer to like components throughout the several views, FIG. 1 shows a vehicle 10 having body structure 12 that partially defines an engine compartment 14 in which a fluid reservoir 16 is mounted. The fluid reservoir 16 is a windshield washer fluid reservoir, but may be a reservoir for another type of fluid used on the vehicle 10 in other embodiments.

An apparatus 18 used for filling the reservoir 16 includes a fill tube 20 that empties into the reservoir 16. The fill tube 20 is shown in fragmented view, and the reservoir 16 is shown in phantom and not to scale. However, a person of ordinary skill in the art readily understands the connection of a fill tube to a windshield washer fluid reservoir. A tab 21 extends from the fill tube 20. A fastener may be extended through an opening in the tab 21 to attach the fill tube to inner fender structure (not shown) to stabilize the fill tube 20. The tube 20 need not necessarily be attached to inner fender structure in this manner.

Figure 2:
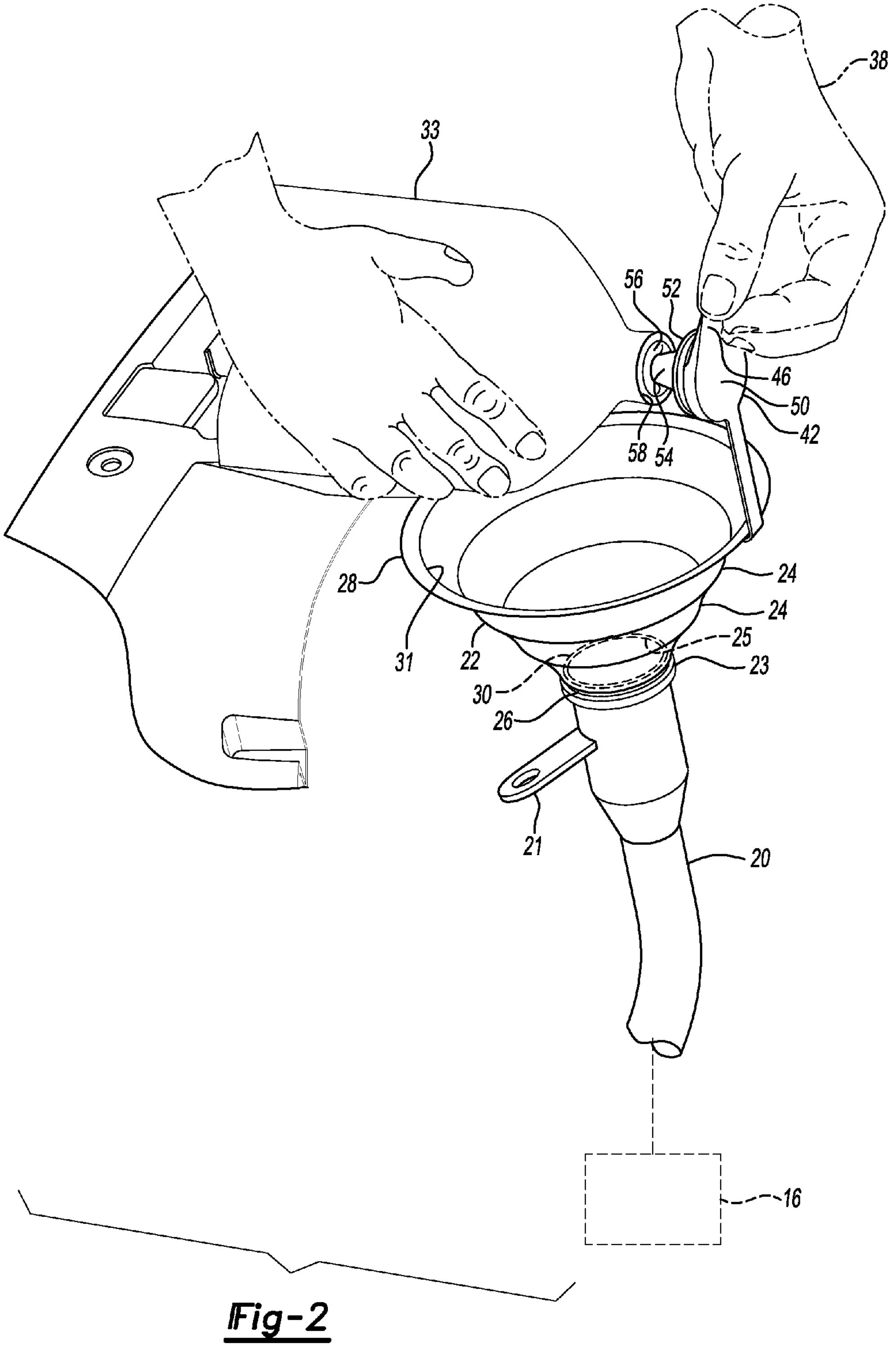
FIG. 2 is a schematic perspective view of the portion of the vehicle with the apparatus of FIG. 1, with the funnel shown in an extended position and the cap removed from the fill tube and piercing a seal of the fluid container.
Figure 3:
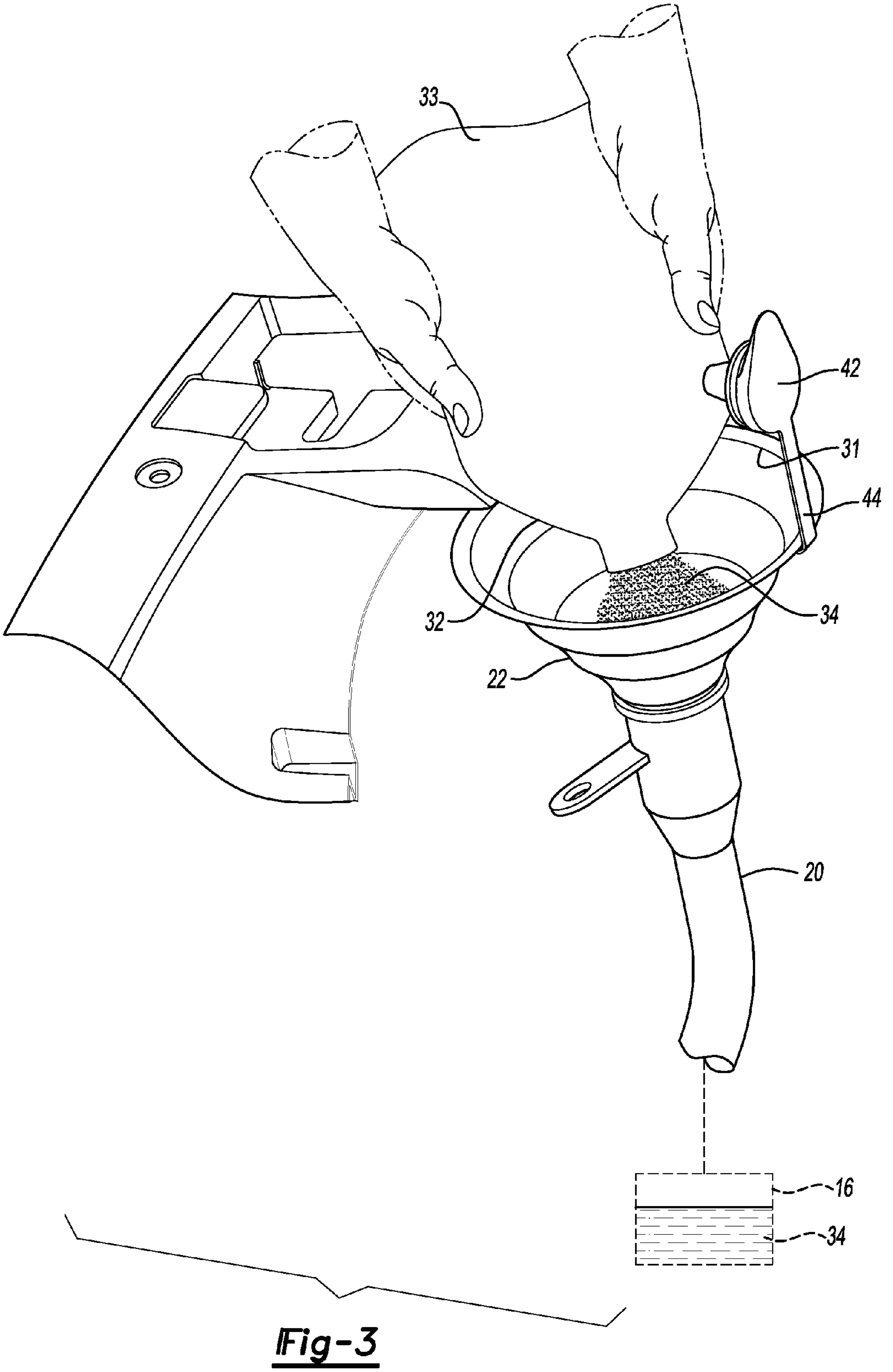
FIG. 3 is a schematic perspective view of the portion of the vehicle with the apparatus of FIG. 1, with the funnel shown in an extended position and the cap removed from the fill tube, and fluid from the container flowing through the funnel and the fill tube to fill the reservoir.

Referring to FIG. 2, a funnel 22 is fixed to an end 23 of the fill tube 20 opposite the receptacle 16. The funnel 22 is fixed around a fill tube opening 25 defined by the fill tube to allow fluid to enter the reservoir 16 through the funnel 22 and the fill tube opening 25 as shown in FIG. 3 and described below. In FIG. 1, the funnel 22 is shown in a collapsed position, also referred to as a stowed position. Preformed accordion-like pleats 24 allow the funnel 22 to collapse in an accordion-like shape as shown in FIG. 1. The funnel 22 has a first end 26 and a second end 28, with the pleats 24 preformed in generally circular shapes between the ends 26, 28. The first end 26 forms a first rim 27, also referred to as an inner rim, and the second end 28 forms a second rim 29, also referred to as an outer rim. The funnel 22 defines a first opening 30 at the first end 26 that is generally aligned with the fill tube opening 25. As shown in FIG. 2, the funnel 22 defines a second opening 31 at the second end 28. A dispensing end 32 of a fluid container 33 fits into the funnel 22 through the second opening 31 so that fluid 34 can be dispensed through the first opening 30 and the fill tube opening 25 into the reservoir 16, as shown in FIG. 3.

In the collapsed position of FIG. 1, a generally circular periphery 36 of the first end 26 is substantially radially aligned with a larger, generally circular periphery 37 of the second end 28. With the low profile of the funnel 22 in the collapsed position, no modifications are required to the depth of the engine compartment 14 or the clearance of the hood (not shown) over the engine compartment 14 when closed. When the funnel 22 is in an extended position of FIG. 2, also referred to as a use position, the second end 28 is further from the end 23 of the fill tube 20 than when in the collapsed position. This causes the pleats 24 to generally flatten. An operator 38 is shown in FIG. 1 applying an upward force to move the funnel 22 in the direction of arrow 40 to the extended position. In the collapsed position of FIG. 1, the extended position of FIG. 2, and in moving between the positions, the entire funnel 22 remains outside of the fill tube 20.

Referring again to FIG. 1, the apparatus 18 includes a cap 42 that is integrally connected to the funnel 22 by a strap 44 attached near the outer rim 29. The cap 42 is configured to fit to the end 23 of the fill tube 20 to close the fill tube opening 25 of FIG. 2 when the funnel is in the collapsed position of FIG. 1. The cap 42 has a lip 46 that extends radially from the cap 42 to form a convenient contact surface, allowing the cap 42 to be pulled upward by the lip 46 to be removed from the end 23 and uncover the fill tube opening 25 of FIG. 2. The cap 42 should be removed from the end 23 prior to moving the funnel 22 to the extended position of FIG. 2. The strap 44 allows the cap 42 to be constantly connected to the funnel 22, so that it is never accidentally misplaced or falls below the vehicle 10 when filling the reservoir 16.

Referring to FIG. 2, the cap 42 is shown with a first side 50 that is exposed when the cap 42 closes the fill tube 20 as in FIG. 1, and a second side 52 with a generally cone-shaped extension 54 extending from the second side 52. The extension 54 is a blunted cone that is configured to be able to pierce a seal 56 covering a dispensing opening 58 of the container 33. As shown in FIG. 2, the operator 38 holds the lip 46 and remainder of the cap 42 to press the cap into the seal 56 and pierce the seal 56. With the integral cap 42 and extension 54, there is no need for the operator 38 to use his fingers, keys, or another instrument to pierce the seal 56. Once the seal 56 is pierced, the container 33 is tipped downward causing fluid 34 to flow into the fill tube 20 to fill the reservoir 16, as shown in FIG. 3. The cap 42 remains attached to the funnel 22 with the strap 44 during the filling process. When the reservoir 16 is filled to a desired level, the container 33 is removed, the funnel 22 is pressed downward to the collapsed position of FIG. 1, and the cap 42 is pressed onto the end 23 of the fill tube 20 to cover and seal the fill tube opening 25 of FIG. 2. A vehicle hood (not shown) may be closed to cover the engine compartment.

While the best modes for carrying out the invention have been described in detail, those familiar with the art to which this invention relates will recognize various alternative designs and embodiments for practicing the invention within the scope of the appended claims.

The invention claimed is:

1. An apparatus for a vehicle having a fluid reservoir fillable with fluid from a container, comprising:

a fill tube that empties into the reservoir; wherein the fill tube defines a fill tube opening;

a funnel fixed to the fill tube and collapsible to a stowed position and extendable to a use position; wherein the funnel defines a first opening that opens into the fill tube opening; wherein the funnel collapses and extends only outside of the fill tube;

a cap connected to the funnel and configured to seal the fill tube opening when the funnel is in the stowed position; wherein the cap is removable from the fill tube opening and has an extension configured to open a seal of the container when the funnel is in the use position to permit filling of the reservoir through the funnel and the fill tube;

wherein the funnel flares radially-outward from a first end fixed to the fill tube to a second end; wherein the funnel is continuous from the first end to the second end both in the stowed position and in the use position; wherein the funnel generally surrounds the fill tube opening with the first end and the second end generally radially-aligned when in the stowed position; and wherein the funnel forms a generally accordion-shape when in the stowed position.

2. The apparatus of claim 1, wherein the extension is substantially cone-shaped.

3. The apparatus of claim 1, wherein the cap is connected to the funnel with a strap extending generally from an outer rim of the funnel.

4. The apparatus of claim 1, wherein the cap has a lip that extends radially-outward from the cap to serve as a contact surface for removing the cap from the first opening.

5. An apparatus for a vehicle having a fluid reservoir fillable with fluid from a container comprising:

a fill tube that empties into the container and defines a fill tube opening at an end opposite the container;

a funnel fixed to the fill tube and having preformed accordion-like pleats; wherein the funnel is collapsible to a stowed position in which the pleats are generally folded and extendable to a use position in which the pleats are generally unfolded;

wherein the funnel flares radially-outward from a first end fixed to the fill tube to a second end; wherein the funnel is continuous from the first end to the second end both in the stowed position and in the use position; wherein the funnel generally surrounds the fill tube opening with the first end and the second end generally radially-aligned when in the stowed position; and wherein the funnel collapses and extends only outside of the fill tube.

6. The apparatus of claim 5, further comprising:

a cap connected to the funnel and configured to seal the fill tube opening when the funnel is in the stowed position; and wherein the cap is removable from the fill tube opening and has an extension configured to open a seal of the container when the funnel is in the use position.

7. An apparatus for a vehicle having a fluid reservoir comprising:

a fill tube that empties into the reservoir and defines a fill tube opening at an end opposite the reservoir;

a funnel having a first end fixed to the fill tube defining a first opening that opens into the fill tube opening and a second end defining a second opening larger than the first opening; wherein the funnel is collapsible to a stowed position and extendable to a use position; wherein the second end is closer to the fixed first end in the stowed position than in the use position; wherein the funnel forms a generally accordion-shape between the first end and the second end when in the collapsed position; wherein the funnel is continuous from the first end to the second end both in the stowed position and in the use position; wherein the first end and the second end each have a respective generally circular periphery; wherein the funnel generally surrounds the first opening with the first end and the second end generally radially-aligned when in the collapsed position;

a cap connected to the funnel and configured to close the fill tube opening when the funnel is in the stowed position; and wherein the cap is removable from the fill tube opening to permit filling of the fluid reservoir when the funnel is in the use position.

8. The apparatus of claim 7, wherein the cap has an extension configured for piercing a seal of a filling container when the cap is removed from the fill tube opening.

9. The apparatus of claim 8, wherein the cap has a first side that is exposed when the cap closes the fill tube opening, and a second side that faces the first opening when the cap closes the fill tube opening; and wherein the extension is on the second side.

10. The apparatus of claim 8, wherein the extension is substantially cone-shaped.

11. The apparatus of claim 7, wherein the cap is connected to the funnel with a strap extending generally from the second end of the funnel.

12. The apparatus of claim 7, wherein the fill tube opening is generally circular; and wherein the cap has a lip that extends radially-outward from the cap to serve as a contact surface for removing the cap from the first opening.

* * * * *